US010032301B2

(12) United States Patent
Balasubramanian et al.

(10) Patent No.: US 10,032,301 B2
(45) Date of Patent: *Jul. 24, 2018

(54) REBUILDING IMAGES BASED ON HISTORICAL IMAGE DATA

(71) Applicant: International Business Machines Corporation, Armonk, NY (US)

(72) Inventors: Swaminathan Balasubramanian, Troy, MI (US); Radha M. De, Howrah (IN); Ashley D. Delport, Ridgefield, CT (US); Indrajit Poddar, Sewickley, PA (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,769

(22) Filed: Feb. 12, 2018

(65) Prior Publication Data

US 2018/0144528 A1 May 24, 2018

Related U.S. Application Data

(63) Continuation of application No. 15/286,931, filed on Oct. 6, 2016.

(51) Int. Cl.
*G06K 9/36* (2006.01)
*G06T 11/60* (2006.01)
(Continued)

(52) U.S. Cl.
CPC .......... *G06T 11/60* (2013.01); *G06F 3/04842* (2013.01); *G06F 17/3087* (2013.01);
(Continued)

(58) Field of Classification Search
CPC ........ G01S 19/00–19/55; H04W 4/185; G06T 3/4038; G06T 11/60; H04N 1/3876; H04N 5/23238; G06K 2009/2045
(Continued)

(56) References Cited

U.S. PATENT DOCUMENTS

| 5,668,897 A | 9/1997 | Stolfo |
| 6,681,058 B1 | 1/2004 | Hanna et al. |

(Continued)

FOREIGN PATENT DOCUMENTS

| CN | 1731449 A | 2/2006 |
| WO | 2014204463 A1 | 12/2014 |

OTHER PUBLICATIONS

Caicedo et al., "Collaborative Personalization of Image Enhancement," IEEE International Conference on Computer Vision and Pattern Recognition (CVPR), Jun. 2011, pp. 249-256.
(Continued)

*Primary Examiner* — Bobbak Safaipour
(74) *Attorney, Agent, or Firm* — Nicholas D. Bowman

(57) ABSTRACT

A sub-image of data of a first full image may be selected. The sub-image of data may at least partially obscure an object within the first full image. A request to replace the sub-image of data may be transmitted over a network. The request may include transmitting the full image and transmitting metadata associated with the first full image to one or more of a server computing device. The server computing device may analyze a history of images and select one or more images of the history of images that match one or more attributes of the metadata. The server computing device may replace the sub-image of data using the one or more images to generate at least a second full image that includes the object, wherein the object is not obscured. The second full image may be received over the network.

1 Claim, 7 Drawing Sheets

(51) Int. Cl.
*G06F 3/0484* (2013.01)
*G06K 9/62* (2006.01)
*G06F 17/30* (2006.01)

(52) U.S. Cl.
CPC .. *G06F 17/30256* (2013.01); *G06F 17/30268* (2013.01); *G06F 17/30867* (2013.01); *G06K 9/6202* (2013.01)

(58) Field of Classification Search
USPC .......................... 342/357.21–357.78; 382/284
See application file for complete search history.

(56) References Cited

U.S. PATENT DOCUMENTS

| | | | |
|---|---|---|---|
| 7,248,736 B2 | 7/2007 | Smith et al. | |
| RE42,847 E | 10/2011 | Politis | |
| 8,098,904 B2 | 1/2012 | Ioffe et al. | |
| 8,237,743 B2 | 8/2012 | Csurka et al. | |
| 8,417,000 B1* | 4/2013 | Mendis | G06K 9/00671 382/118 |
| 8,615,111 B2 | 12/2013 | Garten | |
| 8,630,956 B2 | 1/2014 | Arisawa et al. | |
| 8,768,107 B2* | 7/2014 | Flynn | G06K 9/00704 382/305 |
| 8,823,798 B2 | 9/2014 | Bernal | |
| 8,866,814 B2 | 10/2014 | Brown | |
| 9,124,795 B2 | 9/2015 | Coyle-Gilchrist | |
| 9,275,284 B2 | 3/2016 | Gurbuz | |
| 9,560,271 B2* | 1/2017 | Na | H04N 5/23222 |
| 9,619,928 B2 | 4/2017 | Li et al. | |
| 9,641,818 B1 | 5/2017 | Sharma | H04N 9/74 |
| 9,697,595 B2* | 7/2017 | Bedi | G06T 5/50 |
| 9,807,306 B2* | 10/2017 | Yu | H04N 5/23293 |
| 9,892,538 B1* | 2/2018 | Balasubramanian | G06F 3/04842 |
| 2005/0129324 A1* | 6/2005 | Lemke | H04N 1/387 382/254 |
| 2008/0317378 A1* | 12/2008 | Steinberg | G06T 5/50 382/275 |
| 2010/0046843 A1* | 2/2010 | Ma | G06K 9/00657 382/224 |
| 2013/0051685 A1* | 2/2013 | Shechtman | G06T 11/60 382/218 |
| 2013/0076941 A1 | 3/2013 | Palanduc et al. | |
| 2014/0376830 A1 | 12/2014 | Hyvarinen | |
| 2015/0052475 A1 | 2/2015 | Rapoport et al. | |
| 2015/0278986 A1 | 10/2015 | Edwin et al. | |
| 2015/0332127 A1* | 11/2015 | Zheng | G06T 7/11 382/165 |
| 2016/0005154 A1* | 1/2016 | Meyers | G06T 5/007 382/274 |
| 2016/0012574 A1 | 1/2016 | Li et al. | |
| 2016/0350901 A1 | 12/2016 | Shuster et al. | |
| 2017/0126968 A1 | 5/2017 | Somanath et al. | |
| 2017/0213376 A1 | 6/2017 | Li et al. | |
| 2018/0005068 A1* | 1/2018 | Zamfir | G06K 9/40 |

OTHER PUBLICATIONS

Kost, J., "Fix photos with Content-Aware," Adobe Photoshop CC, Adobe tutorials, Oct. 6, 2014 (printed Apr. 12, 2016), 2 pages, https://helpx.adobe.com/photoshop/how-to/fix-photo-content-aware.html.

Motorola et al., "Use of Server Based Photo Database to Remove Unwanted Artifacts from a Photo Taken on Mobile Device," An IP.com Prior Art Database Technical Disclosure, Jul. 14, 2008, 4 pages, IP.com No. IPCOM000172774D, Copyright © 2008 Motorola, Inc.

Unknown, "PhotoCleaner," printed Apr. 12, 2016, © 2001-2007 Digital Dozen, LLC, 1 page, http://www.photocleaner.com/.

Zhang et al., "Personal Photograph Enhancement Using Internet Photo Collections," IEEE Transactions on Visualization and Computer Graphics, vol. 20, No. 2, Feb. 2014, pp. 262-275, published by the IEEE Computer Society.

Jain et al., "Chapter 15: Object Recognition," Machine Vision, 1995, pp. 459-491, McGraw-Hill, Inc.

Setty et al., "Implementation of Morphing algorithm with Feature-based Image metamorphosis," Final Project, University of Texas at Austin, 2008, pp. 1-2.

Huang et al., "Single-View Reconstruction via Joint Analysis of Image and Shape Collections," ACM Transactions on Graphics (TOG)—Proceedings of ACM SIGGRAPH 2015, vol. 34, Issue 4, Article 87, Aug. 2015, pp. 1-10.

Juliff, L. "How to Remove People From Your Travel Photos Using Photoshop," Too Many Adapters—How Too, Aug. 22, 2013, 17 pages, http://toomanyadapters.com/how-to-remove-people-travel-photos-photoshop/.

Balasubramanian et al., "Rebuilding Images Based on Historical Image Data," U.S. Appl. No. 15/286,931, filed Oct. 6, 2016.

Balasubramanian et al., "Rebuilding Images Based on Historical Image Data," U.S. Appl. No. 15/664,696, filed Jul. 31, 2017.

Accelerated Examination Support Document, U.S. Appl. No. 15/664,696, dated Jul. 28, 2017, 17 pgs.

Balasubramanian et al., "Rebuilding Images Based on Historical Image Data," U.S. Appl. No. 15/854,982, filed Dec. 27, 2017.

Balasubramanian et al., "Rebuilding Images Based on Historical Image Data," U.S. Appl. No. 15/893,780, filed Feb. 12, 2018.

Accelerated Examination Support Document, U.S. Appl. No. 15/893,780, dated Jan. 31,2018, 22 pgs.

IBM, List of IBM Patents or Patent Applications Treated as Related, Feb. 9, 2018, 2 pages.

* cited by examiner

REBUILDING IMAGES BASED ON HISTORICAL IMAGE DATA

BACKGROUND

This disclosure relates generally to image data modification, and more specifically, to at least selecting replacement image data based on analyzing a history of one or more images.

Taking high quality photographs (or video segments) remains a challenge for users due to camera functionality issues and/or problems with the environment in which a photograph is taken. For example, problems may include incorrect camera settings, poor lighting conditions of the environment, and poor image quality (e.g., resolution). One particular issue arises when a photograph/video object is obscured by another undesirable object and the photograph/video displays the undesirable object instead of the obscured object. For example, a tourist may desire to take a photograph of a statue but another person or object may obscure or cover up at least a portion of the statue such that the entire statue is not displayed in the photograph.

SUMMARY

One or more embodiments are directed to a computer-implemented method, a system, and a computer program product for selecting replacement image data. A user request may be received, over a network and from a first computing device, to replace at least a first sub-image of data of a first full image. Metadata may be received, over the network and from the first computing device, which is associated with the first full image. At least some of the metadata may be matched with at least a second sub-image of data by comparing the metadata with a second set of full images. In response to the matching, the first sub-image of data may be replaced with the second sub-image of data.

DETAILED DESCRIPTION

Aspects of the present disclosure relate to selecting replacement image data based on analyzing a history of one or more images. While the present disclosure is not necessarily limited to such applications, various aspects of the disclosure may be appreciated through a discussion of various examples using this context.

Images may be digitally enhanced or touched up in order to aesthetically improve their final display. For example, customized tools may allow for portions of a photograph to be cropped, erased, filled, and/or touched up with brushes and fonts. Some tools may also remove various objects or areas of a photograph, and fill those areas in with a particular pattern. However, these tools use portions of the same photograph to fill in the particular pattern. Accordingly, an inference may be made as to what the removed area should display based on the patterns of the rest of the same photograph. However, one problem with this is that photographs often include asymmetric objects that if obscured or covered, may be impossible to accurately fill in or replace using the same photograph. This is because these asymmetric objects may be digital anomalies such that any display inference made based on the rest of the photograph may be weak.

In an example illustration, a person may purposefully take a photograph of a large billboard to record a phone number. However, if half of the phone number is covered up by an obscuring object, even when removing and replacing the obscuring object, it may be impossible to replace or rebuild the rest of the phone number that is obscured based on using patterns of the same photograph. That is, the obscured or covered part of the phone number is not found in any other portion of the photograph, and so making an inference may be impossible. Compounding matters is that certain objects in a photograph may only be temporarily available such that it is impossible or arduous to take another photograph (e.g., taking pictures of rare events, temporary digital billboards, seasonal decorations of objects, etc.).

Some embodiments of the present disclosure accordingly analyze a history of images that include one or more obscured objects as they appear in an unobscured state such that one or more obscured objects within an image(s) may be removed and replaced with the same objects in an unobscured state. In some embodiments, metadata associated with an obscured object may be received and compared to a history of images to derive an object as described in more detail below. In various embodiments, extensive rebuilding of image data portions occur, which is described in more detail below.

Figure 1:
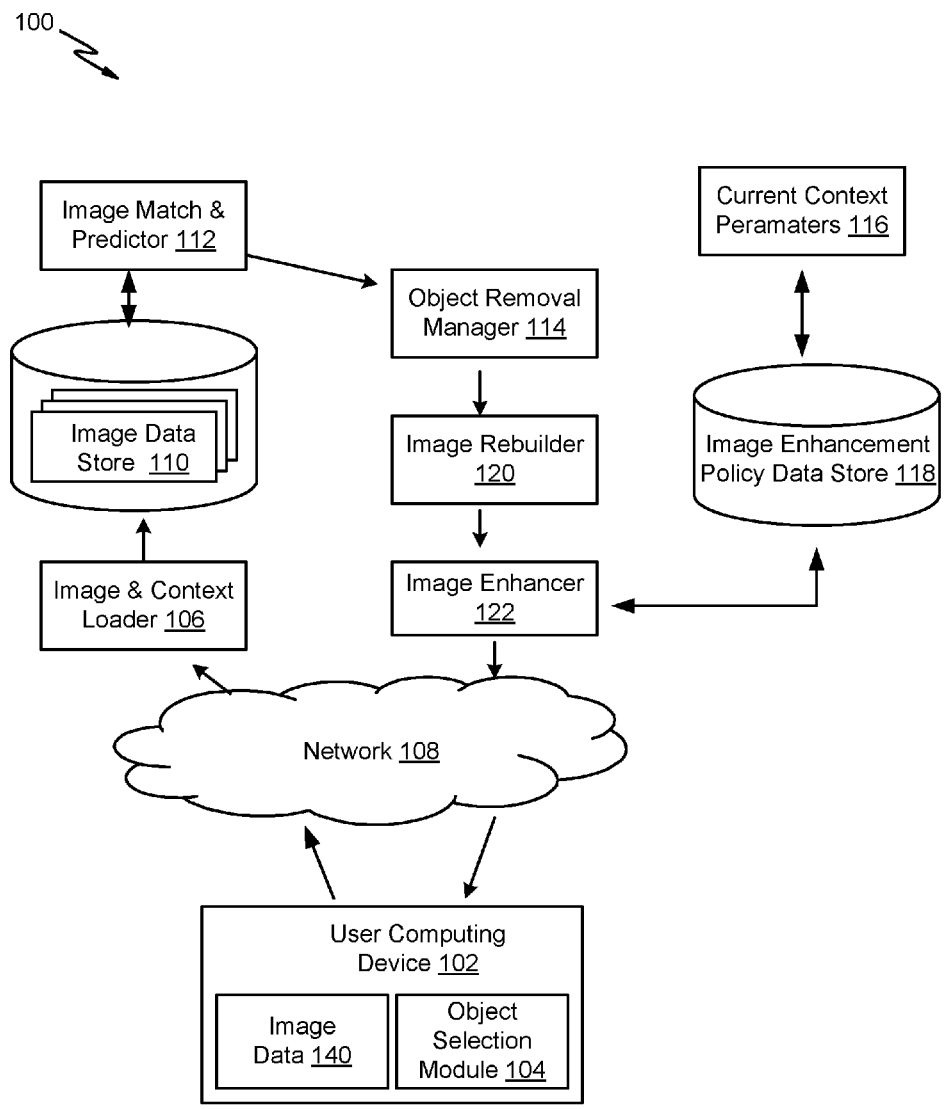
FIG. 1 is a block diagram of a computing environment, according to embodiments.

FIG. 1 is a block diagram of computing environment 100, according to embodiments. The computing environment 100 includes a user computing device 102 (e.g., a mobile device), an image and context loader 106, an image data store 110, an image match and predictor 112, an object removal manager 114, an image rebuilder 120, and an image enhancement policy data store 118. Some or each of these components may be communicatively coupled (e.g., via the network 108) to each other. In some embodiments, the computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

Figure 7:
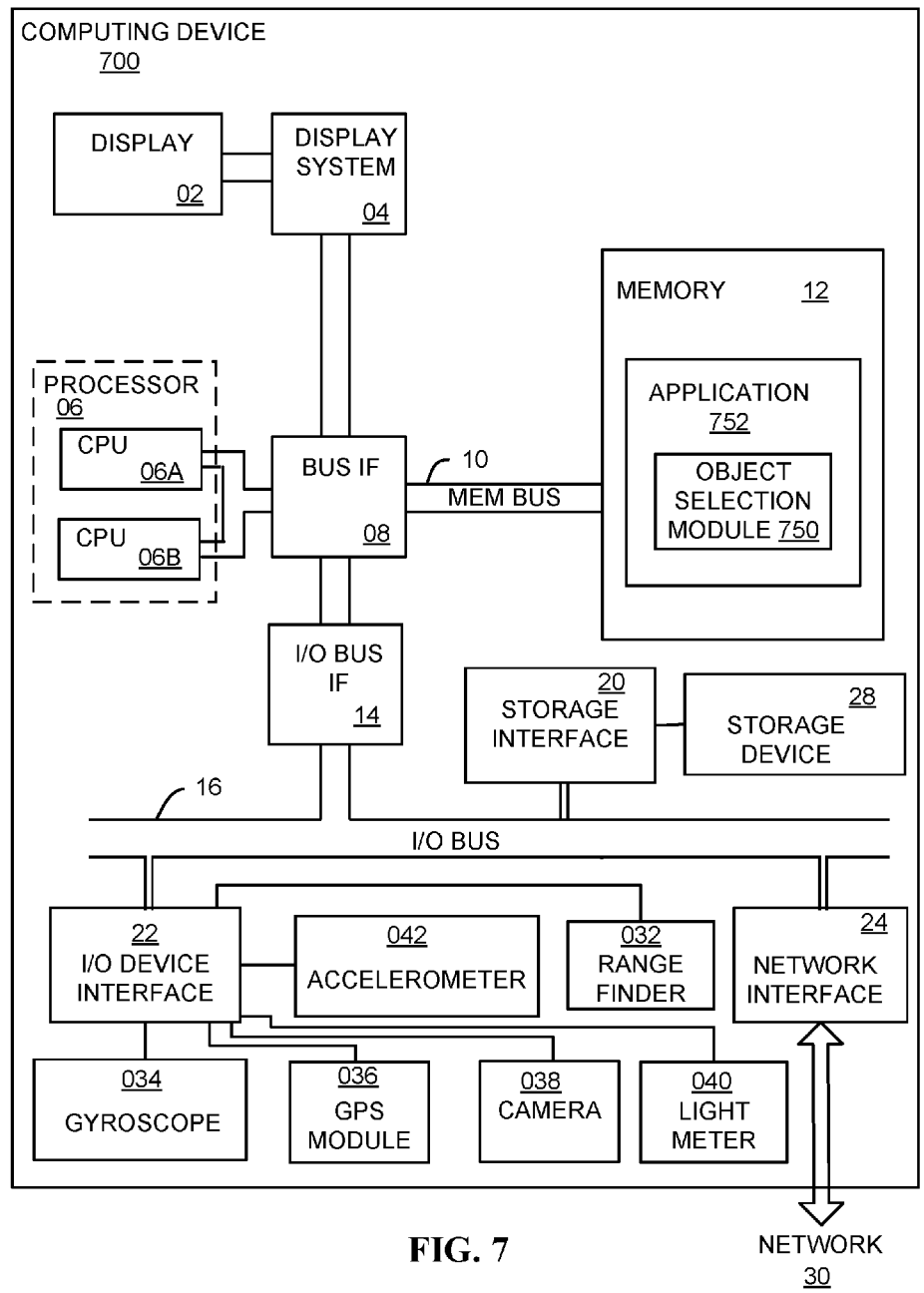
FIG. 7 is a block diagram of a computing device that includes an object selection module and various sensors, according to embodiments While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

Consistent with some embodiments, the user computing device 102 and/or any of the other components (e.g., the image and context loader 106) may be configured the same or analogous to the computing device 700, as illustrated in FIG. 7. In some embodiments, computing environment 100 includes more or fewer components than illustrated in FIG. 1. In some embodiments, the image and context loader 106, the image data store 110, the image match and predictor 112, the object removal manager 114, the current context parameters 116, the image rebuilder 120, the image enhancement policy data store 118 and/or the image enhancer 122 are separate modules (e.g., program instructions/databases) that are included in a single computing device (e.g., a server computing device). In other embodiments, some or each of these components are distinct computing devices. For example, in a cloud computing environment, the image and context loader 106 may correspond to a first computing device, and may communicate (e.g., over a network) with the image data store 110, which corresponds to a second computing device. The image rebuilder 120 may correspond to a third computing device, and may communicate over a network with the image data store 110, etc.

In some embodiments, some or each of: the image and context loader 106, the image data store 110, the image match and predictor 112, the object removal manager 114, the current context parameters 116, the image rebuilder 120, the image enhancement policy data store 118, and the image enhancer 122 may be included within the user computing device 102 instead of or in addition to being communicatively coupled to the user computing device 102 via the network 108 as illustrated in FIG. 1. For example, the object removal manager 114 may be located within the user computing device 102 in order for the user to be able to remove an undesired sub-image of data. In particular embodiments, some or each of the components in the computing environment 100 may be packaged together to form single modules. For example, the image rebuilder 120 and the image enhancer 122 may be combined.

The user computing device 102 may communicate with the rest of the components (and/or the components may communicate with one another) via any suitable network 108. For example, the network 108 may be a local area network (LAN), a Wi-Fi (i.e., IEEE 802.11b) network, a cellular telephone network, a general wide area network (WAN), and/or a public network (e.g., the Internet).

The computing environment 100 illustrates at least that a user may select an undesirable part of an image and the undesirable part of the image may be replaced using at least a second image. As disclosed herein, the term "image," "image data," or the like refers to a visual representation of an item and/or environment, such as photograph(s), video segment(s), and/or digital pictures, etc. A "sub-image" as disclosed herein refers to a portion or part of a "full-image" and thus is not a complete full image.

In an example illustration, a user (via the user computing device 102) may first take a snapshot that results in the image data 140 (e.g., a digital photograph). In response, the image data 140 may be uploaded to the user computing device 102. In some embodiments, the user may use a graphical user interface associated with the object selection module 104 to select a sub-image of data within the image data 140 that the user is not aesthetically pleased with. For example, a portion of the image data 140 may be obscured by an undesirable object within the photograph. The term "obscure" may mean that one object in an image fully or partially covers, overlaps, and/or blurs another object in the image. The user computing device 102 may then transmit a request (via the network 108) to the image and context loader 106 to remove and/or replace the obscured portion with an unobscured version. The user computing device 102 may further transmit the image data 140 and/or other metadata concerning the image data 140 (described in more detail below) to the image and context loader 106. It is to be understood that although the computing environment 100 illustrates that components function in a particular communication order, the communication can be in any order consistent with embodiments. For example, the user computing device 102 may transmit the request to the object removal manager 114 first. The object removal manager 114 removes an undesirable object within the image data 140 according to the user request. For example, after the user selects (e.g., via the object selection module 104) an object to replace within the image data 140, the object removal manager 114 may remove that object (e.g., by deleting the object within the selection boundaries).

In some embodiments, the image and context loader 106 loads the image data 140 transmitted from the user computing device 102 into the image data store 110 and/or loads metadata associated with the image data 140 (e.g., a timestamp of the photograph, geolocation information, angle that the photograph was taken, lighting, etc.). The image data store 110 may include a plurality of existing images, which may include various historical images of various particular locations at particular points in time. In some embodiments, the image data store 110 is a database that includes a geolocation primary key such that the image match and predictor 112 may search for one or more images that include that same geolocation identifier as the image data 140 transmitted from the user computing device 102. Accordingly, a query execution action may include first deriving each database record associated with the same geolocation identifier as the image data 140 that was taken by the user computing device 102, which is described in more detail below.

The image match and predictor 112 may identify an image that includes the full/complete version of an object (e.g., that is being obscured by another object) as the object selected by the object selection module 104 within the image data 140. In some embodiments, the image match and predictor 112 matches one or more units of metadata associated with the image data 140 to one or more images within the image data store 110 in order to identify and replace images with the same object that the user selected (via the object selection module 104), which is described in more detail below. In some embodiments, the image match and predictor 112 may further perform object recognition techniques to match one or more objects of the image data 140 to one or more objects within the image data store 110, which is described in more detail below.

In particular embodiments, after the object removal manager 114 removes the object selected by the object selection module 104, the image rebuilder 120 may begin the process of rebuilding/replacing some or all of the image data 140. In some embodiments, the rebuilding of the image data 140 includes replacing the object selected by the object selection module 104 with an object that is not obscured or faulty in any way. This may happen through various complex algorithms as described in more detail below. In an example illustration, the rebuilding of the image data 140 may include rebuilding/replacing the object that was selected by the object selection module 104 using patterns from the one or more other images that the image match and predictor 112 selected. Specifically, the image data store 110 may include a non-obscured or suitable version of the object selected by the object selection module 104 and the object removal manager 114 may select the suitable version of the object in order to rebuild/replace the object selected by the object selection module 104. In some embodiments, an entirely new image data (e.g., an entire photograph) may be utilized by the image rebuilder 120 (e.g., selected from the image match and predictor 112) as opposed to rebuilding only a portion (e.g., the obscuring object) of the image data 140 itself. This may have the advantage of decreasing network latency and/or increasing throughput by not having to seamlessly rebuild any portion of the image data 140 to generate a homogeneous photograph.

The image enhancer 122 may enhance the image data 140 itself or replica of image data 140. In particular embodiments, the image enhancer 122 may enhance the image data 140 using data within the image enhancement policy data store 118. This data store may include a set of (i.e., one or more) rules that govern the rebuilding and/or enhancing of the image data 140. In some embodiments, the image enhancement policy data store 118 includes the context parameters 116. The context parameters 116 may correspond to data that was transmitted as metadata associated with the image data 140 that was initially transmitted from the user computing device 102. Accordingly, different image fill pattern algorithms may apply the contextual information (e.g., lighting, brightness, distance, image quality, direction, enlarging/reducing one or more portions of the image data 140, etc.) that matches the metadata transmitted from the user computing device 102.

In an example illustration, a user may select (e.g., via the object selection module 104) a first object that is obscuring a second object in a first photograph that was taken at dusk time. The image match and predictor 112 may locate a second photograph that includes the second object in an unobscured state. However, the second photograph may have been taken during mid-day instead of at dusk. Accordingly, when the image rebuilder 120 rebuilds the image data 140 using the second photograph, the lighting may still reflect the mid-day lighting instead of the dusk lighting. Consequently, the image enhancer 122 (or other component) may analyze and determine that this was a particular unit of metadata that was not matched by the image match and predictor 112. Accordingly, the image enhancer 122 may enhance the lighting of second object in an unobscured state in order to match the dusk lighting of the rest of the first photograph.

Figure 2:
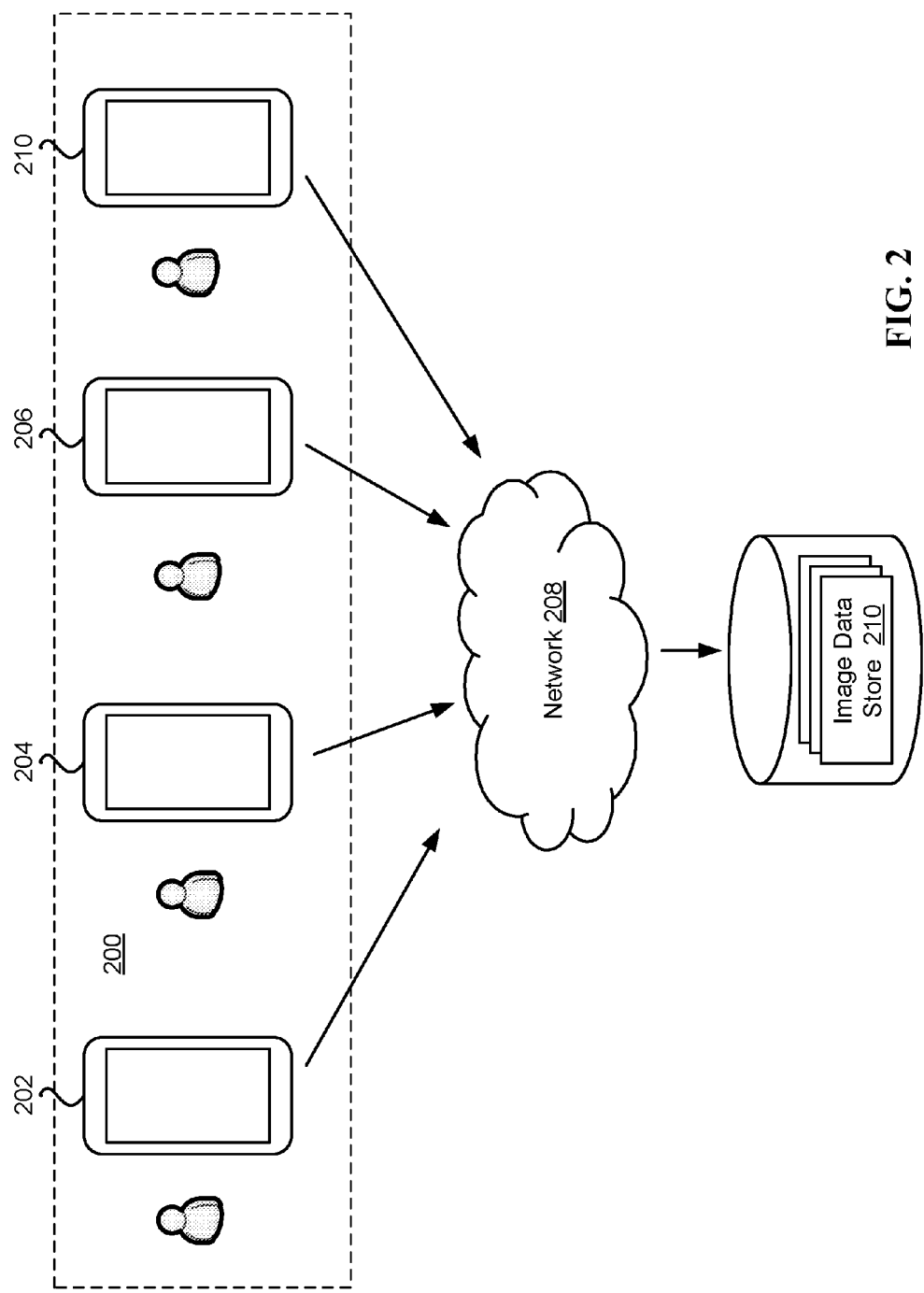
FIG. 2 is a block diagram that illustrates how an image data store may be built, according to embodiments.

FIG. 2 is a block diagram that illustrates how an image data store may be built, according to embodiments. FIG. 2 includes a group network 200 that includes a plurality of users that each have access to a respective computing device—202, 204, 206, and 210. FIG. 2 illustrates that one or more members of the group network 200 may transmit images from their respective computing devices to the image data store 210 via the network 208. In some embodiments, the network 208 is the same as the network 108 in FIG. 1. The image data store 210 may also be the same data store as represented by the image data store 110 of FIG. 1.

The group network 200 may correspond to a group of individuals, such as a social network. The social network may be a group of users who have registered for a particular service that allows them to share and/or have access to information within a central data store (e.g., the image data store 210) for a particular purpose. For example, if each user downloads an application associated with the object selection module 104, the user may agree to have access to and share various digital photographs. Accordingly, for example, each time the user of computing device 202 takes a photograph, the photograph may be transmitted (e.g., as an automated background task) to the image data store 210.

The image data store 210 may result from crowdsourcing various images together in order to adequately rebuild/replace images (or sub-images) of particular users within the group network 202. Accordingly, the generating and downloading of images within the image data store 210 may be outsourced to the users within the group network 200, as opposed to having a single user (e.g., an administrator) be responsible for downloading various images to the image data store 210. This may have several advantages. For example, crowdsourcing may reduce administrator costs by decreasing the amount of time to download images, increase the quantity of images, and/or increase the quality of potential replacement objects or images.

Figure 3:
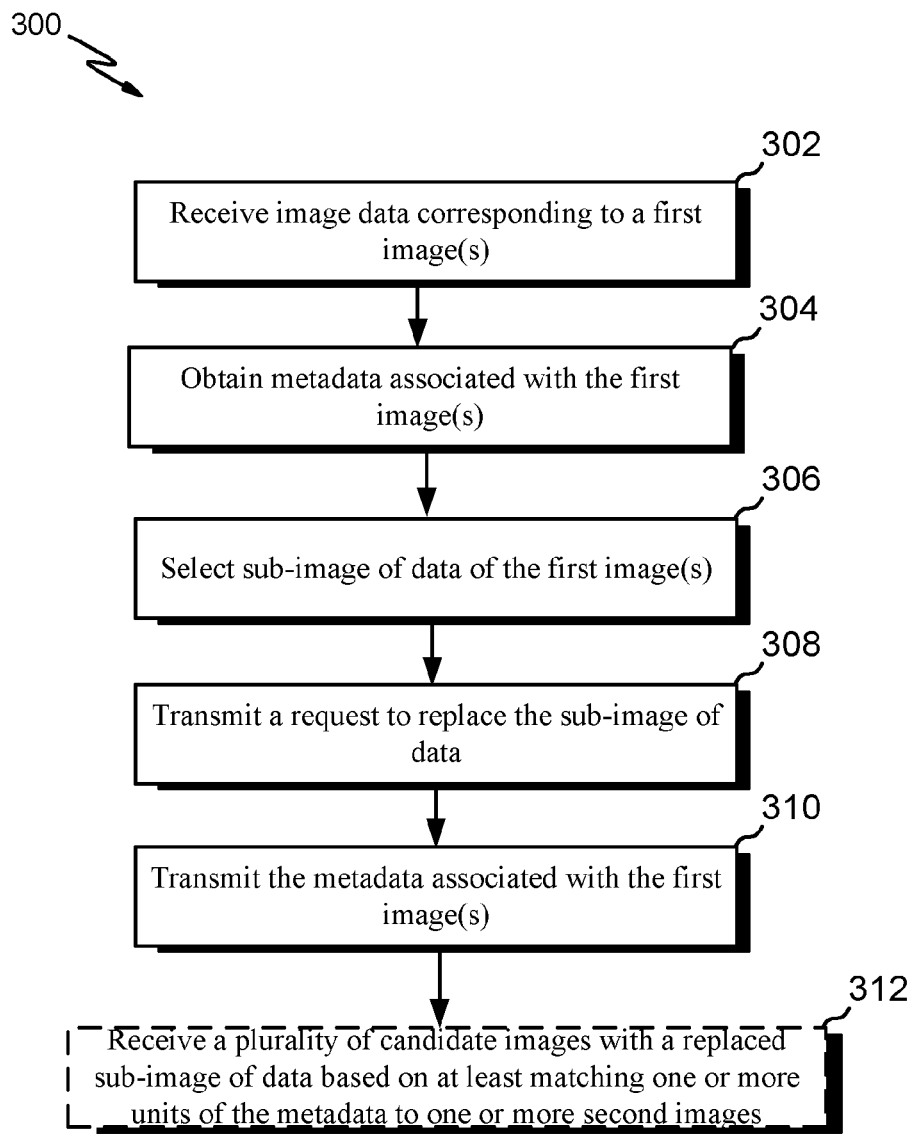
FIG. 3 is flow diagram of an example process illustrating a request to replace a sub-image of data, according to embodiments.

FIG. 3 is flow diagram of an example process 300 illustrating a request to replace a sub-image of data, according to embodiments. In some embodiments, the process 300 begins at block 302 when image data corresponding to a first image(s) is received (e.g., by the user computing device 102). For example, a user may take a digital picture of a scenic background with a mobile device, which may then be received and stored to the mobile device.

Per block 304, metadata associated with the first image(s) and/or camera may be obtained (e.g., by the user computing device 102). For example, using the illustration above, when the user takes the digital picture of the scenic background, not only may the digital picture be written to a storage device (e.g., flash memory), but metadata concerning the digital picture may also be stored to the storage device. The metadata may be any suitable unit or attribute of metadata. For example, in some embodiments, the metadata may be or include Exchangeable Image File Format (EXIF) data. EXIF data (or any other metadata attributes) may include global positioning coordinates of where the first image was taken, a timestamp (e.g., the clock time and/or date) of when the first image was taken, an image ID, an aperture value (to show how much light is allowed to enter a camera based on aperture width), a shutter speed value (the length of time a camera shutter is open to allow light into an image sensor; this value may also indicate how much blurriness is associated with an image), and an International Standards Organization (ISO) value (the level of sensitivity of an image sensor to available light). Adjusting aperture, shutter, and/or ISO values may adjust the lighting, shading, blurriness, focus, sharpness, noise/grain, etc. in a photograph. Together some or each of these values (aperture, shutter, ISO) may form exposure value(s), which at least indicates how light or dark an image is.

The metadata may further include other attributes such as direction and/or angle of the photograph taken (e.g., as measured by a gyroscope, accelerometer, and/or magnetometer), the distance from the camera to an object (e.g., as measured by a range finder), brightness values, bits per pixel, contrast values, digital zoom ratio, whether the flash setting was on or off, pixel height, pixel width, depth, camera maker, camera make/model, resolution values, copyright information, focal length (length of the lens), metering mode (to determine exposure), flash energy, and/or any other suitable attribute of metadata. The metadata can further include color space, which describes a range of colors as tuples of numbers (e.g., Red, Green, Blue (RGB)). This may be useful to understand the color display/snapshot range capabilities of a particular camera and/or image. For example, color space may indicate shadow, highlight, and/or color saturation details of an image.

Per block 306, a sub-image of data of the first image(s) may be selected (e.g., based on a user request of the user computing device 102). For example, a user may utilize a touchpad gesture, mouse pointer, or other selection tool on a display screen that displays a full image. Using the selection tool, the user may specify the boundaries of the object he/she wants to remove and rebuild within the full image. For example, the sub-image of data may at least be partially obscuring an object within the full image. Accordingly, the user may select the sub-image of data.

Per block 308, a request to replace the sub-image of data may be transmitted. The request may be transmitted over a network (e.g., the network 108) and in some embodiments may include transmitting the first image(s) to a server system (e.g., to the image and context loader 106). In some embodiments, the request at block 308 may be based on a separate user request such that the user specifies via a graphical user interface feature that he/she would like to remove and repair the selected sub-image of data. In other embodiments, the request at block 308 may be automated (i.e., occur as a background task without an explicit user request). For example, as soon as the user selects the sub-image of data of the first image(s) at block 306, the first image of data along with the selection boundaries specified by the user may be automatically transmitted to a server computing system without user interaction.

Per block 310, the metadata associated with the first image(s) and obtained at block 304, may be transmitted (e.g., over a network and to one or more server computing devices, such as the image and context loader 106). In some embodiments, the transmitting of the metadata may be part of the transmitting of the request at block 308. In some embodiments, the transmitting of the metadata may be optional and may thus be a separate request. In some embodiments, after the request, image data, and/or metadata has been transmitted to one or more server computing devices, the server computing device may analyze a history of images (e.g., within the image data store 110/210) and select one or more images of the history of images of the history of images that match at least match one or more attributes of the metadata, which is described in more detail below. Further, the server computing device may replace the sub-image of data using the one or more images of the history of images to generate at least a second full image that includes the object in an unobscured form, which is described in more detail below.

Per block 312 and in some embodiments, a plurality of candidate images may be received (e.g., over a network by the user computing device 102). The plurality of candidate images may include various versions of the replaced sub-image of data/objects within images based on at least matching one or more units of metadata to one or more second images as described above. It may be desirable for the user to receive various candidate images with different rebuilt sub-images because the user may effectively select which image he/she is pleased with the most and delete all of the other images. In other embodiments, however, only one image may be received. Accordingly, a server computing device may, for example, rank each of the candidate images and select a single image that has the most matching attributes of metadata. This selected single image may then be transmitted to a user computing device.

Figure 4:
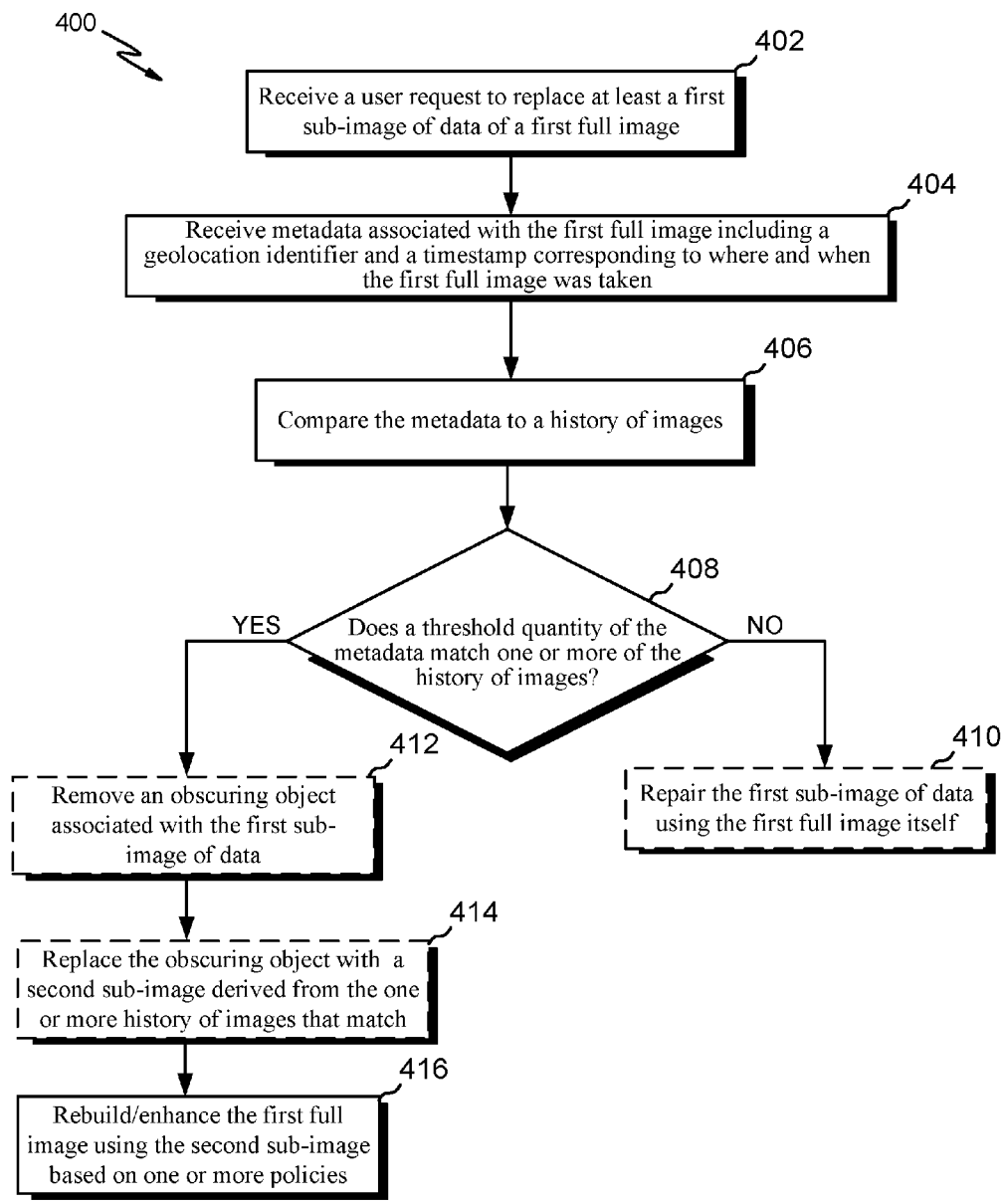
FIG. 4 is a flow diagram of an example process illustrating how a sub-image of data may be replaced, according to embodiments.

FIG. 4 is a flow diagram of an example process 400 illustrating how a sub-image of data may be replaced, according to embodiments. In some embodiments, the process 400 may begin at block 402 when a user request to replace at least a first sub-image of data of a first full image is received (e.g., by the image and context loader 106). For example, in response to a user selecting the first sub-image of data of the first full image, the user's computing device may transmit a request (e.g., over the network 108) to a server computing device(s) to replace the first full image in order to fill in/rebuild the first sub-image with a different pattern than currently exists.

Per block 404, metadata associated with the first full image may be received (e.g., over the network 108 by the image and context loader 106). In some embodiments, the metadata received may include receiving a geolocation identifier and a timestamp corresponding to where and when the first full image was taken by a user respectively. In particular embodiments, instead of or in addition to the geolocation and timestamp metadata received, other metadata may be received, such as some or all of the metadata described in block 304 of FIG. 2 (e.g., aperture values, pixel width, color space, etc.). In an example illustration, after a user takes a snapshot, metadata concerning the snapshot may be uploaded to the snapshot device. The user may then select the first-sub image of data and in response to the selecting, the metadata may be transmitted by the user's snapshot device to a server computing device.

The geolocation identifier may be a value (or set of values) that indicates where the first full image was taken. For example, in some embodiments, if the first full image was taken in an outdoor geographical location, the geolocation identifier may include Global Positioning System (GPS) coordinates and other location information (e.g., latitude value, longitude value, altitude value, whether the user is above sea level, etc.) of where the first full image was taken. In some embodiments, instead of or in addition to the GPS coordinate geolocation identifier, a beacon identifier may be received. A beacon may be a location transmitter that is used to at least determine a device's physical location/position. These devices may be utilized where GPS coordinates may not be as effectively determined, such as indoor locations (e.g., inside of dwellings, museums, or other buildings). A beacon, in some embodiments, may specifically be a BLUETOOTH Low Energy (BLE) device that broadcasts its identifier (e.g., a Universally Unique Identifier (UUI), Major values, and Minor Values) to those devices that are within a signal strength threshold to listen to the broadcasts. In some embodiments, there may be other positioning systems instead of or in addition to the beacons and GPS systems (e.g., indoor positioning systems that use Wi-Fi (IEEE 802.11) access points, etc.).

In an example illustrating how beacon identifiers may be received, a user may first enter a building (e.g., walk through a door). A user's device, such as a mobile device may begin the process of actively listening via the operating system for beacon(s) broadcasts. When the user's device is within a signal strength threshold of one or more of the beacons, the user's device may receive one or more packets of data that identifies one or more of the beacon(s) within the signal strength threshold. As soon as the user takes a snapshot (the first full image), the mobile device 202 may then transmit the identifiers (e.g., as an automated background task) to an associated server computing device that indicates where the mobile device is located. The server computing device may associate every particular beacon with an identifier such that the server knows where the image data was taken.

The geolocation identifiers may be utilized by a system in order to quickly locate images that match the first full image. For example, a geolocation identifier attribute may be a primary key within a database and a database manager may initiate executing a query first by receiving a first geolocation identifier from a user computing device and finding a matching set of second geolocation identifiers within a data store (e.g., the image data store 110) in order to find matching images.

Per block 406, the metadata may be compared (e.g., by the image match and predictor 112) to a history of images or second set of images (e.g., within the image data store 110/210). In some embodiments, the history of images may be a plurality of images that are taken and transmitted from user computing devices of the group network 200 of FIG. 2. The comparing may include analyzing the history of images to determine whether at least some of the metadata received at block 404 matches another set of metadata associated with other images in a data store. The history of images may include one or more image portions that match the sub-image of data in an unobscured state.

In some embodiments, instead of or in addition to comparing the metadata to the history of images, the first full image itself (or portions of the first full image) may be compared to the history of images in order to find one or more matching images. For example, a system (e.g., the image match and predictor 112) may utilize complex image processing algorithms, such as image segmentation and object recognition to locate an identical digital fingerprint of the first full image. These algorithms may include, for example, extracting key points from the first full image that defines the first full image and ranking and scoring matching indexes, such as edge matching, pattern matching, color matching, and/or shape matching, etc. The algorithms may further include orientation measurements between different objects within an image. In an example, pattern matching may include classification, which assumes that a threshold number of features have been detected in an image. If, for example, a model object for each class is known and is represented for class i as $f_{ij}$, J=1, ..., N, i=1, ..., M where M is the number of object classes. If unknown object U is represented as $u_j$, j=1, ..., N. To decide the class of object, the similarity with each class may be measured by computing its distance from the points representing each class in the feature space and assign it to the nearest class. In general, the distance $d_j$ of the unknown object from class j may be computed as given by:

$$d_i = \left[\sum_{j=1}^{N}(u_j - f_{ij})^2\right]^{1/2} \quad \text{Equation 1}$$

then the object may be assigned to the class R such that:

$$d_R = \min_{i=1}^{M}[d_i]. \quad \text{Equation 2}$$

Per block 408, it may be determined (e.g., by the image match and predictor 112) whether a threshold quantity of the metadata match one or more of the history of images. In particular embodiments, the matching of the threshold quantity metadata to the one or more history of images includes matching a first set of metadata associated with the first full image to a second set of metadata associated with a second set of images. For example, the geolocation identifier and/or the timestamp identifier received in block 404 may be matched to a second geolocation identifier and/or timestamp identifier of a second set of full images. These second set of full images may include a second sub-image of data that may be utilized to replace the first sub-image of data, as described below. In some embodiments, the matching of the timestamp identifier may only determine whether the second set of full image(s) were taken within a threshold time period (e.g., a day, week, etc.) of when the first full image was taken. This contemplates that users may be unlikely to take pictures at the exactly the same time but may take them around the same time period. Timestamp metadata may be useful for ensuring that temporary features of an environmental scene (e.g., digital billboards, holiday decorations, etc.) that are within the first full image may also be located within the second set of full images.

The threshold quantity of metadata may be any suitable value and any particular attribute(s) of the metadata may be scored in any manner. For example, static calculations or match estimates may be based solely on the quantity of attributes that match and the threshold may be the highest value. Thus, a second image of a plurality of images may include the highest quantity of metadata attributes that matches the first full image. Accordingly, the second image may be the candidate image for replacement in block 414. In other embodiments, several candidate images may be selected after match estimate calculations and transmitted back to a user computing device as long as each image surpasses some arbitrary matching threshold (e.g., surpass at least 5 matching attributes). This may allow the user to select an image he/she desires.

In some embodiments, dynamic scoring may be performed such as weighting or ranking particular metadata attributes and making a final score that takes into account the weighting. For example, the geolocation and/or timestamp attributes may be weighted higher than other attributes (e.g., pixel width) because in some instances these attributes may be more important for locating matching images. The scoring or matching may in addition or instead include analyzing full images on a granular level, such as plotting, comparing, and matching key points of the first sub-image of data to sub-images of the history of images using object recognition in order make sure that the replaced sub-image of data (block 414) closely matches the angle, lighting, distance, and/or pattern, etc. of the first sub-image. Alternatively, some embodiments include using object recognition matching for features of the entire full image, as described above.

Per block 410, if the threshold at block 408 has not been met then the first sub-image of data may be repaired or replaced using the first full image itself. For example, the first sub-image of data may first be removed and then filled in with patterns from the same first full image. If, for example, the first sub-image of data included some of the background of the first full image as well as a first object that is obscuring a second object within the first sub-image, then the first object may be removed and the background pattern may be used to fill in the rest of the first sub-image.

Per block 412, if the threshold quantity of metadata matches one or more of the history of images, then in some embodiments, an obscuring object associated with the first sub-image of data may be removed (e.g., by the object removal manager 114). For example, the first sub-image of data may include a first object that is obscuring a second object. Consequently, the first object may be removed. In some embodiments, there is no obscuring object and a user may desire to replace the first sub-image of data because he/she is not aesthetically pleased with this portion. For example, the first sub-image of data may be blurred, contain undesirable lighting, contain undesirable shading, etc.

Per block 414, the object that is obscuring another object may be replaced with a second sub-image of data derived from the one or more history of images that match at least match the metadata derived at block 404. In some embodiments, as described above, there may be no obscured object and so the replacing may be replacing the first sub-image itself with the second sub-image because of some aesthetically displeasing feature associated with the first full image. In an example illustration of block 414, a first historical image of the history of images may contain the most matched metadata when compared to the first full image. An identical or analogous sub-image (the second sub-image) to the first sub-image may be located (e.g., via object recognition) and removed within the first historical image and then transposed to the fill space within the first full image where the first sub-image of data was removed. The replacing at block 414 may be effectively rebuilding the object that is being obscured based on using one or more image portions from the historical data that match at least some of the obscured object except that the new objects from the historical data are not in an obscured state. Accordingly, the rebuilding or replacing may cause the first full image to display an object in an unobscured state and not display the first sub-image of data, which may contain the same object but in an obscured state.

Various algorithms may be used to replace the obscuring object or first sub-image of data with the second sub-image of data. For example, morphing algorithms may be utilized (e.g., mesh warping, image-based warping, Beier-Neely morphing algorithm, etc.). Image morphing is a technique that synthesizes a fluid transition from a source image (e.g., the first sub-image) to a destination image (e.g., the second sub-image). The first sub-image is progressively distorted and disappears while the second sub-image starts distorted but the distortion reduces and gradually fades in. Where the algorithm includes one pair of lines (e.g., a line of a building from the first sub-image and a line of a building from the second sub-image), the following algorithm may be utilized:

$$u = \frac{(X - P) \cdot (Q - P)}{\|Q - P\|^2}$$ Equation 3

$$v = \frac{(X - P) \cdot \text{Perpendicular}(Q - P)}{\|Q - P\|^2}$$

$$X' = P' + u \cdot (Q' - P') + \frac{v \cdot \text{Perpendicular}(Q' - P')}{\|Q - P\|^2}$$

where perpendicular ( ) returns the vector perpendicular to, and the same length as, the input vector. The value u is the position along the line, and v is the distance from the line. The value u goes from 0 to 1 as the pixel moves from P to Q, and is less than 0 or greater than 1 outside that range. The value for v is the perpendicular distance in pixels from the line. It is recognized by one with ordinary skill in the art that multiple pairs of lines may be taken into account, as opposed to a single pair as demonstrated above.

Per block 416, the first full image may be rebuilt/enhanced (e.g., by the image rebuilder 120 and/or the image enhancer 122). The rebuilding may be or include enhancing the replaced second sub-image of data based on one or more policies. The rebuilding of the first full image takes into account that in some instances the second sub-image of data may not simply be placed where the first sub-image was located so as to fit into the first full image analogous to a puzzle. For example, the lighting, resolution, color scheme, pattern, etc. of the second sub-image of data may still not match with the rest of the first full image. Accordingly, for example, one or more policies may include identifying that that first full image (absent the second sub-image) was taken at a particular aperture, shutter speed, and/or ISO value with a particular amount of ambient light present (e.g., dusk time). These policies may be based on the metadata parameters received at block 404. Thus the policies (e.g., as found within the image enhancement policy data store 118) may be to match the second sub-image data to one or more of these attributes to further enhance the second sub-image to more fully match the rest of the first full image.

In some embodiments, the enhancement operation at block 416 does not occur because one of the history of images that match at block 408 may already contain the second sub-image of data with matching enhancement features thereby making the replacement step (block 414) the final step. In some embodiments, the first full image is not rebuilt/enhanced but rather an entirely new full image is selected and transmitted to a user. For example, one of the history of images that match the metadata at block 408 may be used to completely replace the first full image. Accordingly, instead of removing and replacing the first sub-image of data of the entire first full image, the entire first full image may be replaced such that the replacement includes the first sub-image of data in an unobscured or aesthetically pleasing state.

Figure 5:
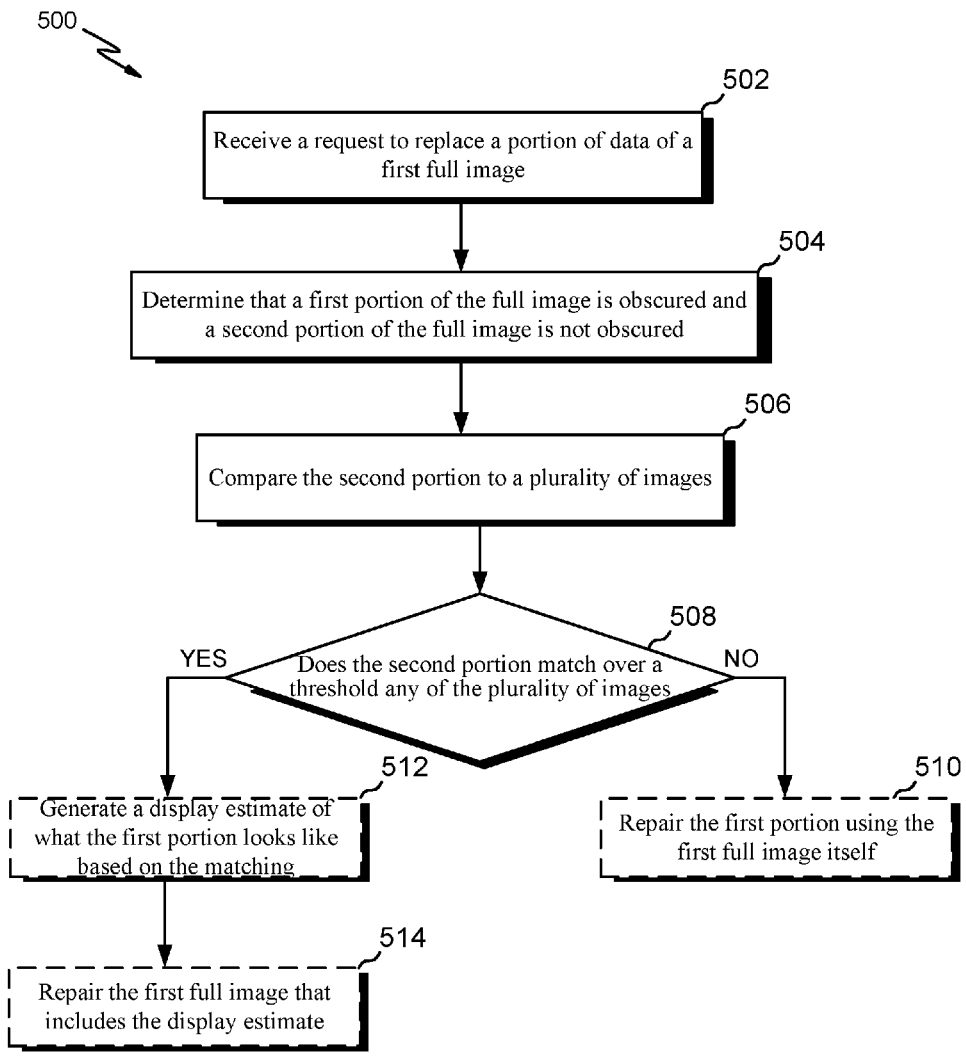
FIG. 5 is a flow diagram of an example process illustrating how a sub-image of data may be replaced, according to embodiments.

FIG. 5 is a flow diagram of an example process 500 illustrating how a sub-image of data may be replaced, according to embodiments. In some embodiments, some or each of the blocks in the process 500 may be implemented instead of or in addition to the process 400 of FIG. 4 as a way to replace sub-images. Per block 502 a request may be received to replace a portion of a first full image. Per block 504, it may be determined that a first portion of the image is obscured and a second portion of the image is not obscured. The first and second portions may be associated with a particular object within the image. In an example illustration of how block 504 may occur, a user may utilize two selection tools within a GUI. A first selection tool may indicate the general area that needs to be analyzed—the first and second portions. A second selection tool may be utilized within the general area (as defined by the first selecting tool) to indicate the object that is not obscured—the second portion. This may allow a system (e.g., the image match and predictor 112) to determine that the second portion is not obscured and should be the area utilized to compare to other images to generate a display estimate as discussed in blocks 506 and 508.

Per block 506, the second portion may be compared to a plurality of images. Per block 508, in response to the comparing it may be determined whether the second portion matches (e.g. via object recognition) any portion of the plurality of images over a threshold. For example, the image data store 110 of FIG. 1 may include a historical image that has a same digital fingerprint as the second portion but instead of having its matching first portion obscured, it may be in an unobscured state. Therefore, because the historical image matches the second portion, even though it does not match the first portion (because the first portion is obscured in the first full image), the second portion may still be considered to be matched above a threshold.

Per block 510, if the second portion does not match any of the plurality of images over a threshold then the first portion may be repaired using the first full image itself. Per block 512, if the second portion matches any of the plurality of images over the threshold, then a display estimate of what the first portion looks like may be generated based on the matching in block 508. For example, the image data store may not necessarily include a full image that matches the first full image in any way, such as a digital fingerprint of the same location within the same timeline. However, the first full image may include one or more objects that is recognized in isolation and can be utilized for repairing. For example, the first full image may include a stop sign and the stop sign may consist of the first portion and the second portion. A central data store, such as the image data store 110 may include various isolated image objects, such as well-known objects to use for replacement (e.g., traffic signs, trademarks, landmarks, car makes/models, logos, etc.). Using the example above, the second portion of the stop sign may be compared to an isolated image that includes comparable portions to the first portion. Accordingly, the comparable portions can be used to fill in or replace the first portion based on analyzing the second portion with the isolated image.

Per block 514, the first full image may be repaired, which includes implementing the display estimate in block 512. The rebuilding may include applying various other context parameters associated with the first full image (e.g., the metadata received at block 404 of FIG. 4), such as sizing the comparable portions to fit the rest of the second portion, shading, coloring, etc. In some embodiments, the repairing may include utilizing the algorithms described above, such as morphing algorithms.

Figure 6A:
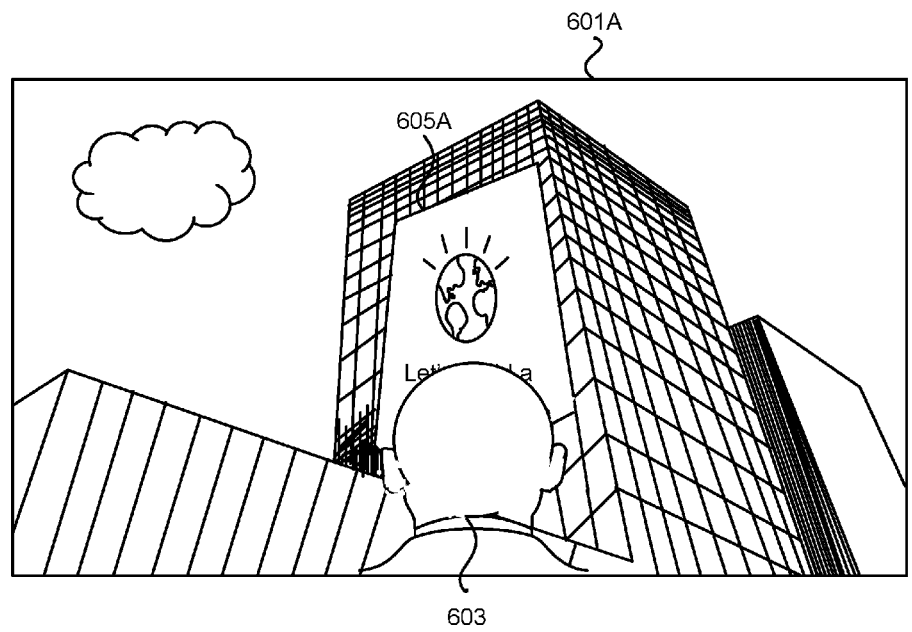
FIG. 6A illustrates an example image that includes an obscuring object and an obscured object, according to embodiments.

FIG. 6A illustrates an example image 601A that includes an obscuring object 603 and an obscured object 605A, according to embodiments. The image 601A demonstrates that a person's posterior head and neck region—the obscuring object 603—is covering up a portion of the billboard and portions of a building—the obscured object 605A. Consistent with embodiments, after a user takes a snapshot of the image 601A, he/she may desire to remove the object 603 in order to replace or fill in the rest of the billboard that is covered such that the billboard will be displayed in an unobscured state. The user may thus select the object 603 (e.g., via the object selection module 104) in order to transmit a request to remove and replace the object 603 with what would otherwise be displayed but for the object 603 being in the way.

Figure 6B:
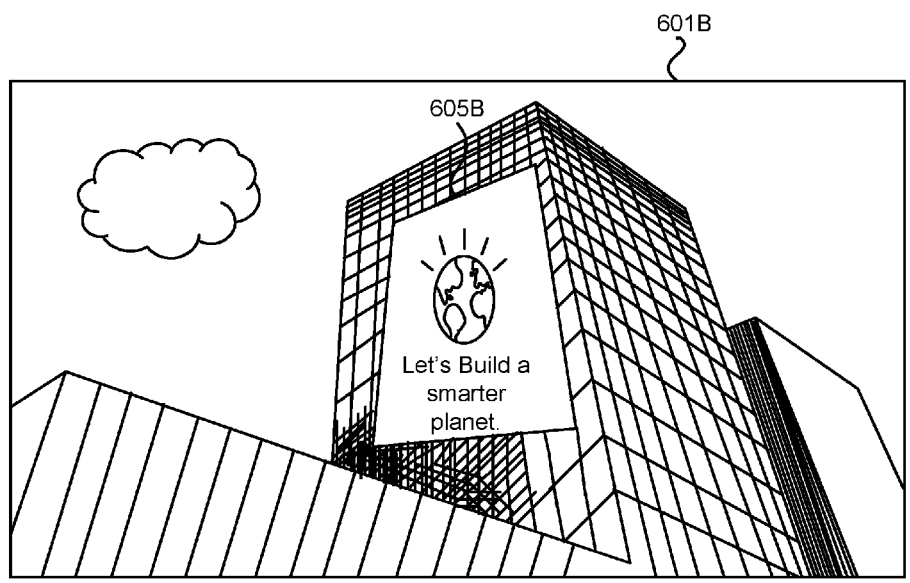
FIG. 6B illustrates an example image that includes an identical digital fingerprint to the image of FIG. 6A, except without the obscuring object

FIG. 6B illustrates an example image 601B that includes an identical digital fingerprint to the image of FIG. 6A, except without the obscuring object 603. Image 601B may be the image 601A at a second subsequent time. When the obscuring object 603 is removed, it may be replaced and rebuilt with at least the object 605B, which may be the complete version of the obscured object 604A of FIG. 6A. Accordingly, it now may be determined that the obscured object 605A includes a billboard that reads "Let's Build a smarter planet," as shown in FIG. 6B. FIG. 6B may demonstrate that in particular embodiments, current digital enhancement technologies (e.g., PHOTOSHOP) may be improved. For example, current enhancement technologies may attempt to fill in the areas of the obscured object 605A that are covered by the obscuring object 603 by using the same image 601A. However, it may be impossible to generate the object 605B to display the indicia by utilizing patterns of the same image 605A because only the letter "L" is fully displayed in the image 601A. But implementing the operations as described above may overcome this problem.

FIG. 7 is a block diagram of a computing device 700 that includes an object selection module 150 and various sensors, according to embodiments. According to various embodiments, the computing device 700 can represent a user computing device, a server computing device, or any other computing device. The components of the computing device 700 can include one or more processors 06, a memory 12, a storage interface 20, an Input/Output ("I/O") device interface 22, and a network interface 24. The I/O device interface 22 may be coupled to the accelerometer 042, range finder 032, light meter 40, camera 038, GPS module 036, and gyroscope 034. These components are communicatively coupled, directly or indirectly, for inter-component communication via a memory bus 10, an I/O bus 16, bus interface unit ("IF") 08, and an I/O bus interface unit 14.

The computing device 700 may include one or more general-purpose programmable central processing units (CPUs) 06A and 06B, herein generically referred to as the processor 06. In an embodiment, the computing device 700 may contain multiple processors; however, in another embodiment, the computing device 700 may alternatively be a single CPU device. Each processor 06 executes instructions stored in the memory 12 (e.g., the object selection module 150).

The computing device 700 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the I/O device interface 22 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O devices and the computing device 700, may receive output data via the user output devices. For example, a user interface may be presented via a user I/O device, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the datastores described herein, including datastores 118 and 110 of FIG. 1. The I/O device interface 22 provides an interface to any of various other I/O devices or devices of other types, such as sensors, printers, or fax machines. The network interface 24 provides one or more communication paths from the computing device 700 to other digital devices and computer systems (e.g., via Wi-Fi network, a cellular network, etc.).

Although the computing device 700 shown in FIG. 7 illustrates a particular bus structure providing a direct communication path among the processors 06, the memory 12, the bus interface 08, the display system 04, and the I/O bus interface unit 14, in alternative embodiments the computing device 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 700, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 700 is a user camera device, multi-user mainframe computer system, a single-user system, or a server computer or similar device that has little or no direct user interface, but receives requests from other computer systems (clients). In other embodiments, the computing device 700 may be implemented as a desktop computer, portable computer, laptop or notebook computer, tablet computer, pocket computer, telephone, smart phone, or any other suitable type of electronic device.

In various embodiments, the "mobile device" as described herein may refer to a computing device that is not constrained in its location like a desktop or data center is. Mobile devices may be portable or easily moveable and establish wireless connections (e.g., TCP/IP) to other devices without having to be connected via a fixed physical link (e.g., a wire). Examples of mobile devices include a smart phone, portable computer, a handheld computing device, a laptop or notebook computing device, a tablet computing device, a pocket computing device, a smart television, and/or any other suitable type of mobile electronic computing device.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 700, and may also include the virtual memory of other computer systems coupled to the computing device 700 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., the object selection module 150) shown in FIG. 7. These programs and data are illustrated in FIG. 7 as being included within the memory 12 in the computing device 700; however, in other embodiments, some or all of them may be on different computer systems and may be accessed remotely, e.g., via a network 30. The computing device 700 may use virtual addressing mechanisms that allow the programs of the computing device 700 to behave as if they only have access to a large, single storage entity instead of access to multiple, smaller storage entities. Thus, while the components and data shown in FIG. 7 are illustrated as being included within the memory 12, these components and data are not necessarily all completely contained in the same storage device at the same time. Although the components and data shown in FIG. 7 are illustrated as being separate entities, in other embodiments some of them, portions of some of them, or all of them may be packaged together.

In some embodiments, the components and data shown in FIG. 7 may include instructions or statements that execute on the processor 06 or instructions or statements that are interpreted by instructions or statements that execute on the processor 06 to carry out the functions as described above. In another embodiment, the components shown in FIG. 7 (e.g., the object selection module 150) may be implemented in hardware via semiconductor devices, chips, logical gates, circuits, circuit cards, and/or other physical hardware devices in lieu of, or in addition to, a processor-based system.

In various embodiments the application module 752 is a module that includes program instructions to perform some or each of the operations as specified in FIGS. 1-6B, such as transmitting requests to replace sub-images of data and receiving one or more images or sub-images over a network. The object selection module 750 in some embodiments is the same object selection module 104 of FIG. 1

In some embodiments, the accelerometer 042, range finder 032, gyroscope 034, GPS module 036, camera 038, and light meter 040 are each sensors utilized to obtain various attributes of metadata of an image (e.g., the metadata described in block 304 of FIG. 3). It is to be understood that the computing device 700 may include more, fewer, or different sensors than illustrated to obtain metadata. In an example illustration, the accelerometer 042 and/or gyroscope 034 may be utilized to obtain metadata attributes concerning the angle and/or acceleration a computing device was in when an image was taken. The range finder 032 may measure the distance of the computing device 700 to a nearby object in the environment (e.g., the object in which a user takes a picture of). For example, an optical range finder may emit active signals of light and measure the time until reflection of this signal arrives back at the optical range finder from the object in the environment. The light meter 040 may measure various aspects of exposure by measuring incident and/or reflected light (e.g., measuring ISO, shutter speed, etc.). The camera 038 make take still frames (photographs) and/or record video clips. The GPS module 036 may include a receiver that receives pulsed signals from satellites and measures the distance between such signals via analyzing phase shifts. And by triangulating signals from multiple satellites, these receivers can determine their absolute location on earth. The GPS module may be utilized to receive the geolocation identifier as described above.

FIG. 7 is intended to depict representative components of the computing device 700. Individual components, however, may have greater complexity than represented in FIG. 7. In FIG. 7, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacturer including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for selecting replacement image data, the system comprising:
a memory; and
a processor configured to obtain instructions from the memory that cause the processor to perform a method comprising:
receiving, over a network and from a first computing device, a user request to replace a first sub-image of data of a first full image, a portion of the first full image being obscured by the first sub-image of data, the first full image being a digital photograph;
receiving, over the network and from the first computing device, the first full image and metadata associated with the first full image, the metadata including attributes of: a first geolocation identifier of where the first full image was taken, a first set of exposure values of the first full image, a first timestamp identifier of when the first full image was taken, a distance measurement value indicating a distance from the first computing device to an object within an environment that the first full image was taken in, an angle value indicating an angle with which the first full image was taken at, a bit value indicating bits per pixel of the first full image, a set of contrast values of the first full image, a digital zoom ratio value of the first full image, a setting value indicating whether a flash setting was on or off for a camera of the first computing device that captured the first full image, a pixel height value of the first full image, a pixel width value of the first full image, a depth value of the first full image, a model value indicating a camera make and model of the camera, a set of resolution values of the first full image, a focal length value of the first full image, and a color space value of the first full image;
matching the first geolocation identifier to a second geolocation identifier associated with a second set of full images, the second set of full images being taken in a same location as the first full image, the second set of full images being downloaded from a plurality of user mobile devices to a central datastore;
matching the first timestamp identifier to a second timestamp identifier associated with a subset of the second set of full images, wherein the subset of the second set of full images is taken within a threshold time period of when the first full image was taken, the subset of the second set of full images matching the portion of the first full image in an unobscured state;
removing the first sub-image of data from the first full image;
replacing the first sub-image of data with a second sub-image of data based on the matching of the first geolocation identifier to the second geolocation identifier, and further based on the matching of the first time stamp identifier to the second timestamp identifier, wherein the second sub-image of data is included within one of the subset of the second set of full images; and
enhancing the second sub-image of data based on changing one or more features of the second sub-image to match the metadata associated with the first full image, the enhancing including adjusting a second set of exposure values of the second sub-image of data to match the first set of exposure values of the first full image.

* * * * *